J. O. FORKER.
TRANSMISSION APPARATUS.
APPLICATION FILED JUNE 19, 1907.
927,961.
Patented July 13, 1909.
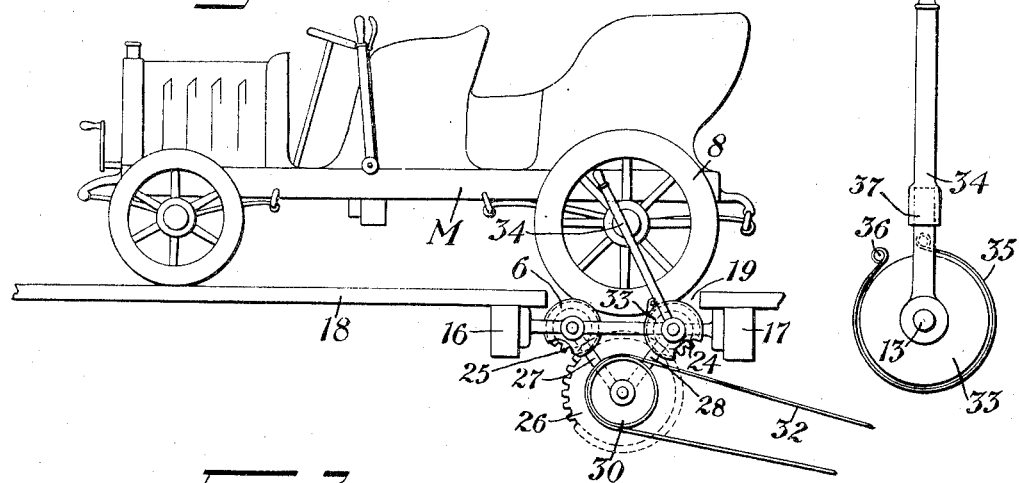
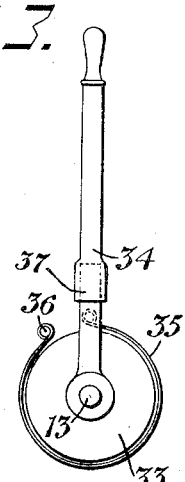
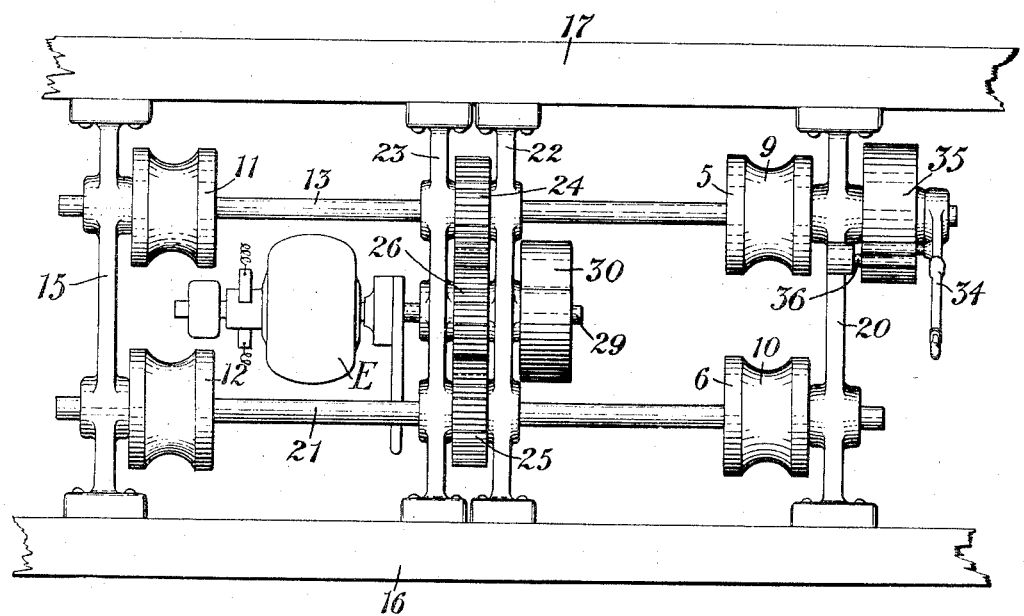
Witnesses
M. Levy.
H. D. Penney.
Inventor
J. O. Forker.
By his Attorney
F. H. Richards.

UNITED STATES PATENT OFFICE.

JULIUS O. FORKER, OF NEW YORK, N. Y.

TRANSMISSION APPARATUS.

No. 927,961.      Specification of Letters Patent.      Patented July 13, 1909.

Application filed June 19, 1907. Serial No. 379,708.

*To all whom it may concern:*

Be it known that I, JULIUS O. FORKER, a citizen of the United States, residing in the borough of Brooklyn, city of New York, in the county of Kings and State of New York, have invented certain new and useful Improvements in Transmission Apparatus, of which the following is a specification.

This invention relates to power transmitting mechanism and is especially designed for using the driving or rear wheels of a motor vehicle for driving machinery of any desired nature.

The object of the invention is to provide transmission mechanism whereby the rear or driving wheels of a motor vehicle can be placed thereon without in any way altering the motor vehicle and the power from the driving of such wheels will be applied to a power transmission member such as a belt pulley.

In the accompanying drawing illustrating one embodiment of my invention, Figure 1 is a side elevation of the device and of a motor vehicle in operative position thereon. Fig. 2 is a plan view of the transmission mechanism; and Fig. 3 shows a form of brake.

The device is preferably placed in or beneath the floor where the motor vehicle can be run, and is provided with suitable pulleys or wheels for engaging the tire or rim of the motor vehicle for sustaining the weight thereof and the frictional engagement of which when driven by the motor of the vehicle, will cause rotation of the pulleys or wheels. The pulleys are preferably placed below the level of the floor, and arranged in two pairs, one on each side a short distance removed to sustain the weight of the wheels and car thereon.

In the construction illustrated in Fig. 2, a pair of wheels or pulleys 5 and 6 are rotatably arranged in alinement a suitable distance apart and with their axes level, to receive one of the driving wheels 8 of a motor vehicle, denoted generally by M. These pulleys preferably have their rims grooved at 9 and 10 as illustrated, to receive the usual form of inflated tires. On the opposite side are a pair of similar pulleys 11 and 12 that are similarly placed to receive the other driving wheel of the motor vehicle, not shown. The pulleys 9 and 11 are preferably secured to a shaft 13 that may be supported at each end in a beam 15 extending across between joists 16 and 17 of the floor 18; the latter being provided with an opening 19 above the four grooved pulleys. The other end of the shaft 13 is supported in a similar beam 20; and these two beams also form bearings for another shaft 21 to which is secured the two pulleys 11 and 12. A suitable transmission member, such as a belt pulley, is connected to be driven from both of these two shafts 13 and 21. In the construction illustrated the two shafts are also rotatably supported by cross beams 22 and 23, and between these are mounted gears 24 and 25, on the shafts 13 and 21 respectively. A larger gear 26 is supported by brackets 27 and 28 at each end and is in mesh with both of the gears 24 and 25. To the shaft 29 of the gear 26 is secured a suitable driving pulley, such as a belt pulley 30. Power may be transmitted from this belt pulley by a belt 32, to operate any desired mechanism. When it is desired to arrest the movement of the transmission mechanism, a suitable brake is applied. The shaft 13 is shown as provided with a band pulley 33, and a brake lever 34 is loosely pivoted on this shaft. A brake band 35 has one end secured to the lever 34 and its other end to a stationary pin 36 connected with the beam 28, the band 35 passing around the drum 33. By shifting the lever the band 35 will be caused to tightly grip the drum 33 and prevent rotation of the shaft 13, and consequently of the other shaft through the gears.

In the operation of the device, the grooved pulleys being set a short distance beneath the floor 18, in the opening 19, the car M is backed so that the rear wheels will run on to these four grooved pulleys, resting thereon as illustrated in Fig. 1. Then the motor is operated, and the rotation of the rear wheels will revolve the four grooved pulleys, and consequently through the two gears the belt pulley 31 will be driven. By this means it is seen that it is absolutely unnecessary to make any change in the construction or arrangement of the motor vehicle, but it is simply run on to the grooved pulleys and then the rear wheels are operated from the motor in the same manner as if the vehicle was running on the road.

If desired an electric generator E can be coupled direct to the shaft 29, and be driven by the transmission apparatus from the motor of the car, to furnish an electric current for lighting purposes or for power.

When it is desired to run the car off from the transmission device, the brake lever is swung to arrest the movement of the pulleys, when the car can be run forward up on to the floor.

The brake lever 34 has a socket joint at 37 whereby the handle portion can be removed and will not project above the floor 18. This will permit a trap to be placed in the floor at the opening 19 to close the same, when the apparatus is not in use.

The transmission device is of especial advantage for use in a country place remote from fire extinguishing apparatus, as the belt can be connected with a pump or a pump could be connected direct with the shaft 29, in place of the electric generator E. Upon a fire occurring in the garage or a house or building in the vicinity, a car can be quickly run on the transmission rollers and the pump be brought at once into use, and a stream of water furnished to extinguish the fire. The motor cars in use frequently being provided with motors from forty to sixty H. P., a heavy stream of water could be thrown by the pump that could be of great service to put out a fire, and could be forced through a line of hose of considerable length. Thus the apparatus takes the place of a fire engine, and could be brought into use in even less time than it would take to bring a fire apparatus to the place where the fire occurred and put it into operation. At the same time, no extra space is needed as the transmission device can be placed in the floor, and the pump also.

Having described my invention what I claim is:

In combination, a floor for supporting an automobile and having an aperture therein, a pair of pulleys supported beneath said floor and adjacent said aperture and adapted to support an automobile drive wheel and be rotated by said wheel, mechanism connected to said pulleys to be driven thereby, a brake for said pulleys, whereby they may be held against rotation and said vehicle driven off of and on to the latter, an operating lever for said brake extending upwardly through said aperture and above said floor and detachable from said brake, whereby the aperture in said floor may be closed when said pulleys and mechanism are not in use.

Signed at Nos. 9–15 Murray street, New York, N. Y., this 13th day of June, 1907.

JULIUS O. FORKER.

Witnesses:
FREDERICK PFEIFER,
WILLIAM H. REID.